United States Patent
Nakanishi et al.

(10) Patent No.: US 8,802,302 B2
(45) Date of Patent: Aug. 12, 2014

(54) AIR BATTERY INCLUDING OXYGEN-CONTAINING SOLVENT

(75) Inventors: Shinji Nakanishi, Mishima (JP); Hirotoshi Imai, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 271 days.

(21) Appl. No.: 12/678,001

(22) PCT Filed: May 19, 2009

(86) PCT No.: PCT/JP2009/059186
§ 371 (c)(1),
(2), (4) Date: May 6, 2010

(87) PCT Pub. No.: WO2010/134161
PCT Pub. Date: Nov. 25, 2010

(65) Prior Publication Data
US 2012/0058402 A1    Mar. 8, 2012

(51) Int. Cl.
*H01M 8/22*    (2006.01)
(52) U.S. Cl.
USPC .......................... 429/402; 429/403; 429/407
(58) Field of Classification Search
USPC .................. 429/402, 403, 404, 407, 472
See application file for complete search history.

(56) References Cited

FOREIGN PATENT DOCUMENTS

| CN | 1450677 A | 10/2003 | |
|---|---|---|---|
| JP | 3051455 | 3/2000 | |
| JP | 2004-119278 A | 4/2004 | |
| JP | 2005-116317 | * 4/2005 | ............ H01M 12/05 |
| JP | 2005-116317 A | 4/2005 | |
| JP | 2005-166685 A | 6/2005 | |

OTHER PUBLICATIONS

Office Action issued Sep. 6, 2012 in CN Application No. 200980100365.9 and translation of relevant portions thereof.

* cited by examiner

*Primary Examiner* — Raymond Alejandro
(74) *Attorney, Agent, or Firm* — Kenyon & Kenyon LLP (57) ABSTRACT

An air battery which can maintain a good performance and inhibit ingress of water into its housing. The air battery including a power section having an air electrode, an anode containing an alkali metal, and an electrolyte layer conducting ions between the air electrode and the anode; an oxygen-containing solvent showing both hydrophobic nature and oxygen solubility; a housing being configured to incorporate the power section and the oxygen-containing solvent; and an oxygen supply portion being configured to supply oxygen gas to the oxygen-containing solvent. The oxygen-containing solvent being arranged between the oxygen supply portion and the electrolyte layer.

17 Claims, 3 Drawing Sheets

AIR BATTERY INCLUDING OXYGEN-CONTAINING SOLVENT

This is a 371 national phase application of PCT/JP2009/059186 filed 19 May 2009, the contents of which are incorporated herein by reference.

TECHNICAL FIELD

The present invention relates to an air battery.

BACKGROUND ART

An air battery is a battery employing oxygen as a cathode active material; at the time of discharge, air is introduced from outside the battery. So, compared with other type of batteries which incorporate active materials for both cathode and anode, it is possible to enlarge the occupancy rate of the anode active material in the battery case. Hence, in principle, such an air battery has features that dischargeable electric power is large, besides, as downsizing and weight saving can be easily realized. In addition, oxidation power of oxygen to be employed as the cathode active material is strong so that the electromotive force is relatively high. Moreover, since oxygen is a clean resource the amount of which is not limited, the air battery is environmentally-friendly. As above, air battery has many advantages; therefore it is expected to be used for batteries for mobile devices, electric vehicles, hybrid cars, and fuel-cell-powered vehicle.

With regard to an air battery using a metal as the anode, when water enters into a battery, the water and the anode tend to react. If the water and the anode react, it predicts that the air battery may be deteriorated. So, to inhibit deterioration of the air battery, presumably, it is important to avoid contact between the anode and water.

As an art related to such an air battery, for example, Patent literature 1 discloses an art to inhibit contact of an anode and water by giving hydrophobic nature to the non-aqueous electrolyte using a room-temperature molten salt as a non-aqueous electrolyte of the air battery, such as trimethyl propylammonium bis(trifluoromethylsulfonyl)imide.

CITATION LIST

Patent Literature

Patent Literature 1: Japanese Patent Application Laid-Open (JP-A) No. 2005-116317

SUMMARY OF THE INVENTION

Technical Problems

Like the art as seen from Patent literature 1, to give hydrophobic nature to the non-aqueous electrolyte, the non-aqueous electrolyte must have ion conductive property; therefore, not only hydrophobic nature but also ion conductive property have to be given to the non-aqueous electrolyte. However, it has been difficult for the non-aqueous electrolyte to have both hydrophobic nature and ion conductive property.

Accordingly, an object of the present invention is to provide an air battery which can maintain the performance of the battery and can keep water out from the housing.

Solution to Problems

To solve the above problems, the present invention takes the means as follows. In other words, the invention is an air battery comprising: a power section which comprises: an air electrode, an anode containing an alkali metal, and an electrolyte layer conducting ions between the air electrode and the anode; an oxygen-containing solvent showing both hydrophobic nature and oxygen solubility; a housing being configured to incorporate the power section and the oxygen-containing solvent; and an oxygen supply portion being configured to supply oxygen gas to the oxygen-containing solvent, the oxygen-containing solvent being arranged between the oxygen supply portion and the electrolyte layer.

In the invention, the term "oxygen supply portion" means an opening to introduce an oxygen-containing gas such as air into the housing. The location and numbers of the oxygen supply portion are not particularly limited as long as the oxygen supply portion is arranged away from the electrolyte layer. By arranging the oxygen supply portion away from the electrolyte layer and providing a hydrophobic oxygen-containing solvent between the oxygen supply portion and the electrolyte layer, it is possible to inhibit ingress of water from the oxygen supply portion into the electrolyte layer.

In the air battery of the invention, the oxygen supply portion preferably has an oxygen supply means to supply the oxygen gas by bubbling. By having the mode, even when the dissolved oxygen in the oxygen-containing solvent decreases in relation to the discharge reaction, it is possible to supply oxygen rapidly into the oxygen-containing solvent.

In the air battery of the invention, the housing is provided with: an inlet port and an outlet port for the oxygen-containing solvent; and a cyclic path being disposed outside the housing to circulate the oxygen-containing solvent from the outlet port to the inlet port, the oxygen-containing solvent circulating in the housing and the cyclic path. By having the mode, the oxygen dissolved in the oxygen-containing solvent can be efficiently used.

The air battery may have a mode where the electrolyte layer is insoluble in the oxygen-containing solvent and has a smaller specific gravity than that of the oxygen-containing solvent, and the power section is arranged at the upper side in the vertical direction of the oxygen-containing solvent such that the anode is arranged at the upper side in the vertical direction. In such a case, an interface between the electrolyte layer and the oxygen-containing solvent is preferably in the air electrode. Moreover, preferably, the oxygen supply portion is provided at one end of an oxygen supply pipe, the other end of which is connected to the lower portion of the housing, and an interface is formed between the oxygen-containing solvent and the oxygen-containing gas in the oxygen supply pipe, wherein the oxygen supply portion is located at a higher level than that of the interface. By having the mode, it is possible to inhibit leakage of the oxygen-containing solvent from the oxygen supply portion. In addition, an exhaust port is preferably provided at the upper portion of the housing. A regulator to be released at a predetermined pressure is preferably provided at the exhaust port; further, an inducing means being configured to direct the air inside the housing toward the exhaust port is preferably provided.

In the air battery of the invention, a plurality of the power sections are preferably incorporated in the housing.

Effects of the Invention

The present invention can provide an air battery which is capable of maintaining a good battery performance and inhibiting ingress of water into the housing.

LIST OF REFERENCE NUMERALS 1 air electrode
2 anode
3 electrolyte layer
4 power section
5 oxygen-containing solvent
6 housing
6a inlet port
6b outlet port
7 separator
8 cyclic path
9 oxygen supply portion
11 oxygen supply means
10 air battery
20 air battery
30 air battery
31 air electrode
32 anode
33 electrolyte layer
34 power section
35 oxygen-containing solvent
36 housing
37 oxygen supply pipe
39 oxygen supply portion
40 air battery
42 anode (or inducing means)
43 electrolyte layer
44 power section
46 housing

DESCRIPTION OF MODES FOR CARRYING OUT THE INVENTION

When water enters into the power section of the air battery and contacts the anode, the air battery is deteriorated. However, the conventional air batteries have difficulties in inhibiting contact of the anode with water while maintaining good performance of the air battery. As a result of intensive study by the present inventors, they discovered that it is possible to maintain a good battery performance and inhibit ingress of water into the housing by arranging a hydrophobic and oxygen-soluble oxygen-containing-solvent between an oxygen supply portion and an electrolyte layer. It is assumed that it is possible to inhibit the deterioration of the air battery by inhibiting ingress of water into the housing.

The present invention is completed based on the discovery. The invention is mainly to provide an air battery which is capable of inhibiting ingress of water into the housing.

Hereinafter, the invention will be more specifically described with reference to the drawings. It should be noted that the embodiments shown below are examples of the present invention so that the invention is not limited by the embodiments.

1. First Embodiment of the Invention

Figure 1:
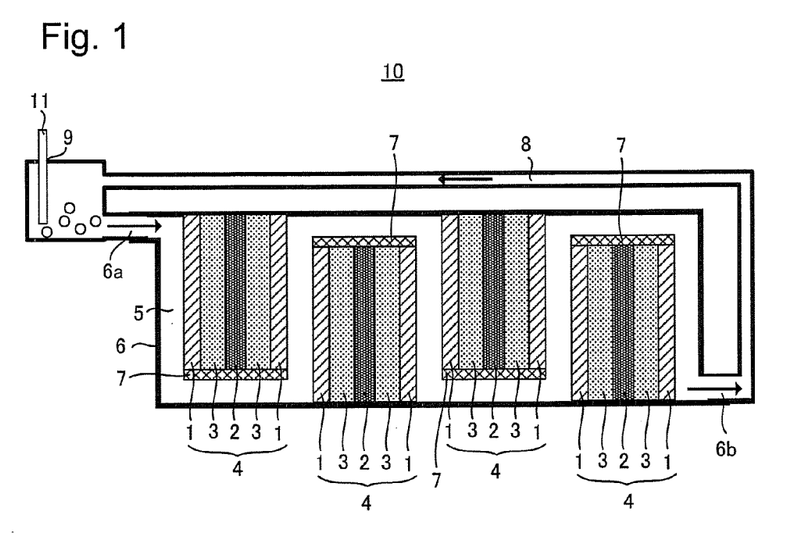
FIG. 1 is a cross-sectional view showing an embodiment of the air battery 10.

FIG. 1 is a cross-sectional view schematically showing an embodiment of the air battery 10 of the present invention. As shown in FIG. 1, the air battery 10 comprises: power sections 4 each comprising: air electrodes (namely, cathode layers) 1, an anode 2, and electrolyte layers 3 sandwiched between the air electrode 1 and the anode 2; an oxygen-containing solvent 5; and a housing 6 being configured to incorporate a plurality of the power sections 4, 4, . . . and the oxygen-containing solvent 5. In the air battery 10, since the hydrophobic oxygen-containing solvent 5 is filled in the housing 6, it is possible to inhibit ingress of water into the housing 6. Moreover, the oxygen-containing solvent 5 is arranged between an oxygen supply portion 9 and the electrolyte layer 3 and exhibits not only hydrophobic nature but also oxygen solubility so that the oxygen-containing solvent 5 can supply oxygen dissolved therein to the air electrode 1 and inhibit ingress of water to the anode 2. Therefore, the air battery 10 can maintain a good performance and inhibit deterioration thereof caused by the reaction of the anode 2 with water. FIG. 1 shows an embodiment where the air electrode 1 is arranged to be in contact with the oxygen-containing solvent 5; in the air battery of the invention, as long as the embodiment can take oxygen dissolved in an oxygen-containing solvent into the electrolyte layer, the oxygen-containing solvent is not necessarily in contact with the air electrode. Because, since the air electrode is in contact with the electrolyte layer, cell reaction can be performed at the cathode using oxygen transferred from the oxygen-containing solvent to the electrolyte layer. The air battery 10 will be described as follows on the element basis.

<Power Section 4>

The power section 4 comprises: an air electrode 1 arranged at the sides to be in contact with the oxygen-containing solvent 5; an anode 2 arranged at the central position; and electrolyte layers 3 sandwiched between the air electrode 1 and the anode 2, wherein the air electrode 1 and the anode 2 are in contact with the electrolyte layer 3. Moreover, FIG. 1 shows schematically a cross-section of the power section 4; the power section 4 may be a laminated body where the anode 2 is sandwiched by electrolyte layers 3, 3 and the obtained product is further sandwiched by the air electrode (namely, cathode layer) 1, 1. Alternatively, the power section 4 may be a cylindrical mode where the electrolyte layer 3 is wound around the anode 2 and the cathode layer 1 is further wound on the outer circumference of the electrolyte layer 3. By having these modes, it is possible to easily improve the output per unit volume (i.e. power density) of the power section 4. In the air battery 10, the air electrodes 1, 1, . . . and the anodes 2, 2, . . . may be electrically connected in series or in parallel.

The power section 4 is immersed in the oxygen-containing solvent 5 inside the housing 6 so that volatilization of the electrolyte provided in the electrolyte layer 3 can be inhibited. Further, the power section 4 is incorporated in the housing 6 such that the air electrode 1 is in contact with the oxygen-containing solvent 5; the anode 2 and the electrolyte layer 3 are separated from the oxygen-containing solvent 5 by a separator 7. Hence, leakage of the electrolyte provided in the electrolyte layer 3 into the oxygen-containing solvent 5 can be inhibited. The separator 7 is to separate the anode 2 and the electrolyte layer 3 from the oxygen-containing solvent 5; as long as it does not prevent cell reaction, the separator 7 is not particularly limited. Specific examples of materials constituting the separator 7 include: an engineering plastic such as polycarbonate.

(Air Electrode 1)

The air electrode 1 contains: a conductive material, a catalyst, and a binder to bind these two. Moreover, the air electrode 1 is provided with an air electrode current collector which abuts on either inside or outer surface of the air electrode 1 to collect the current of the air electrode 1.

The conductive material contained in the air electrode 1 is not specifically limited as long as it can withstand operational environment of the air battery 10 and has conductive property. The conductive material contained in the air electrode 1 may be, for example, carbon materials such as carbon black and mesoporous carbon. In view of e.g. decrease of reaction site and reduction of battery capacity, the content of the conductive material in the air electrode 1 is preferably 10 mass % or more. In addition, in view of e.g. forming an embodiment which exhibits sufficient catalytic function, the content of the conductive material in the air electrode 1 is preferably 99 mass % or less.

As the catalyst contained in the air electrode 1, there may be cobalt phthalocyanine and manganese dioxide. In view of forming an embodiment which can exhibit sufficient catalytic function, the content of the catalyst in the air electrode 1 is preferably 1 mass % or more. In view of inhibiting e.g. decrease of reaction site and reduction of battery capacity, the content of the catalyst in the air electrode 1 is preferably 90 mass % or less.

Examples of the binder contained in the air electrode 1 may be polyvinylidene fluoride (PVDF) and polytetrafluoroethylene (PTFE). The content of the binder in the air electrode 1 is not specifically limited; it is preferably 10 mass % or less, 1 mass % or more and 5 mass % or less is more preferable.

The air electrode 1 can be produced by using doctor-blade method, for example, by applying a coating comprising: carbon black; a catalyst; and a binder, on the surface of the below-described air electrode current collector. Other than this, it can be produced by a method of thermocompression bonding using a mixed powder containing carbon black and a catalyst.

In the air battery 10, the air electrode current collector functions to collect current of the air electrode 1. The material of the air electrode current collector in the air battery 10 is not particularly limited as long as it is made of a material having conductive property. Examples of the material for the air electrode current collector include: a stainless steel, nickel, aluminum, iron, titanium, and carbon. The shape of such air electrode current collector may be, for instance, mesh (or grid).

(Anode 2)

The anode 2 contains an alkali metal which functions as an anode active material. Moreover, the anode 2 is provided with an anode current collector (not shown) which abuts on either inside or outer surface of the anode 2 to collect the current of the anode 2.

Examples of elemental substance of alkali metal to be contained in the anode 2 include: lithium, sodium, and potassium. In addition, examples of alkali metal compounds to be contained in the anode 2 may be lithium alloy. When the air battery 10 is a lithium-air secondary battery, in view of providing an air battery 10 which easily attains high capacity, lithium is preferably contained.

The anode 2 desirably contains at least an anode active material; it may further contain a conductive material for improving conductive property and a binder for fixing the alkali metal and the like. In view of inhibiting, e.g., decrease of reaction site and reduction of battery capacity, the content of the conductive material in the anode 2 is preferably 10 mass % or less. Also, the content of the binder in the anode 2 is not specifically limited; however, for example, it is preferably 10 mass % or less, more preferably 1 mass % or more and 5 mass % or less. Kinds and dosage, and so on of the conductive material and binder both to be contained in the anode 2 are the same as those of the air electrode 1.

In the air battery 10, the anode 2 is provided with an anode current collector which abuts on either inside or outer surface of the anode 2 to collect the current of the anode 2. The anode current collector functions to collect current of the anode 2. In the air battery 10, the material of the anode current collector is not particularly limited as long as it has a conductive property. Examples of the material for anode current collector include: copper, a stainless steel, and nickel. The shape of the anode current collector may be foil, plate, and mesh (or grid). In the air battery 10, the anode 2 can be produced, for example, in the same manner as that of the air electrode 1.

(Electrolyte Layer 3)

The electrolyte layer 3 incorporates an electrolyte (in liquid or solid type) functioning as conducting ions (of alkali metal) between the air electrode 1 and the anode 2.

When a liquid electrolyte (electrolytic solution) is used as an electrolyte layer 3, the type of the electrolytic solution is not particularly limited as long as it has metal ion conductivity and be insoluble in the hydrophobic oxygen-containing solvent 5. Examples of the electrolytic solution which can be used as the electrolyte layer 3 may be the below-described non-aqueous electrolytic solution. Kinds of the electrolytic solution to be used as the electrolyte layer 3 are preferably adequately selected depending on the kinds of conducting metal ions; for instance, in case of lithium-air battery, non-aqueous electrolytic solution containing lithium salt and an organic solvent is preferably used. Examples of lithium salt include: inorganic lithium salt such as $LiPF_6$, $LiClO_4$, LiBOB, and $LiAsF_6$; and organic lithium salt such as $LiCF_3SO_3$, $LiN(CF_3SO_2)_2$, $LiN(C_2F_5SO_2)_2$, and $LiC(CF_3SO_2)_3$. Examples of the organic solvent include: ethylene carbonate (EC), propylene carbonate (PC), dimethyl carbonate (DMC), diethyl carbonate (DEC), ethyl methyl carbonate (EMC), butylene carbonate, γ-butyrolacton (GBL), sulfolane, acetonitrile, 1,2-dimethoxy methane, 1,3-dimethoxy propane, diethyl ether, tetrahydrofuran, 2-emthyl tetrahydrofuran, and the mixture thereof. It should be noted that, in view of forming an embodiment in which the dissolved oxygen can be efficiently used, the organic solvent is preferably a solvent which shows high oxygen solubility. The concentration of the lithium salt in a non-aqueous electrolytic solution is, for example, 0.2 mol/L or more and 3 mol/L or less. In the air battery of the present invention, as the non-aqueous electrolytic solution, for example, a low-volatility liquid such as ionic liquid can be used.

On the other hand, when using an electrolytic solution for the electrolyte layer 3, the electrolyte layer 3 is preferably a mode where the electrolytic solution is kept by a separator or a gel polymer. Examples of the separator include: a porous membrane such as polyethylene and polypropylene; and non-woven fabric such as non-woven resin fabric and non-woven glass fabric. Examples of the gel polymer include: an acrylate-based polymer compound; an ether-based polymer compound such as polyethylene oxide, and a cross-linked body containing thereof; a methacrylate polymer compound such as polymethacrylate; a fluorine-based polymer compound such as polyvinylidene fluoride, as well as a copolymer of polyvinylidene fluoride and hexafluoropropylene. Type of the gel polymer may be granular; as long as the gel polymer is capable of keeping the electrolytic solution, it is not particularly limited. With respect to the production of the electrolyte layer 3, the production method is not particularly limited; an electrolyte layer 3 having a predetermined shape can be produced by impregnating an adequately formed separator or a gel polymer packed-bed with the above electrolytic solution and by keeping the electrolytic solution in the separator or the gel polymer.

\<Housing 6\>

The housing 6 at least incorporates the power section(s) 4 and is filled with the oxygen-containing solvent 5. The housing 6 is provided with an inlet port 6a and an outlet port 6b for the oxygen-containing solvent 5; the inlet port 6a and the outlet port 6b are connected to each other through a cyclic path 8 outside the housing 6. As the material of the housing 6, a material which can be used for housing of an air battery may be suitably used.

\<Oxygen-Containing Solvent 5\>

The oxygen-containing solvent 5 is a liquid having hydrophobic nature and oxygen solubility. For the oxygen-containing solvent 5, a liquid which is insoluble in the electrolytic solution provided to the electrolyte layer 3 is used. Specific examples of the oxygen-containing solvent 5 used for the present invention include a fluorine-based solvent. More specifically, there may be: a chain fluorocarbon such as $C_6F_{14}$, $C_7F_{16}$, $C_8F_{18}$, and $C_9F_{20}$; hexafluorobenzene (HFB); and hydrofluoroether (HFE) such as $C_4F_9OCH_3$ (commodity name "7100"), $C_4F_9OC_2H_5$ (commodity name "7200"), $C_6F_{13}OCH_3$ (commodity name "7300"), and $C_3HF_6$—CH$(CH_3)$ O—$C_3HF_6$ (commodity name "7600"), all manufactured by 3M Company.

In the air battery 10, the oxygen-containing solvent 5 flows in the direction shown by arrows of FIG. 1. As it were, the oxygen-containing solvent 5 enters from the inlet port 6a to the housing 6, is discharged from the outlet port 6b and passes through the cyclic path 8, and re-enters from the inlet port 6a to the housing 6. To the oxygen-containing solvent 5, oxygen gas is supplied from the oxygen supply means 11 arranged at the oxygen supply portion 9 during the circulation. By supplying oxygen gas to the solvent 5 and circulating the oxygen-containing solvent 5, it is capable of efficiently using the oxygen dissolved in the oxygen-containing solvent 5.

\<Oxygen Supply Portion 9\>

The air battery 10 is provided with an oxygen supply portion 9 to supply oxygen gas to the oxygen-containing solvent 5. The oxygen supply portion 9 is not particularly limited as long as it can supply oxygen to the oxygen-containing solvent. FIG. 1 shows an embodiment where the oxygen supply means 11 supplying oxygen gas by bubbling is arranged at the oxygen supply portion 9. However, the invention is not limited to the embodiment, there may be another embodiment simply having an opening configured to make the oxygen-containing solvent 5 being in contact with air (oxygen-containing gas).

\<Oxygen Supply Means 11\>

The oxygen supply means 11 is provided with a pump and a pipe to make oxygen gas flow therein. One end of the pipe is immersed in the oxygen-containing solvent 5. In the side surface of the one end, a plurality of pores are given. Therefore, by introducing oxygen gas trough the pipe using the pump and bubbling the oxygen gas into the oxygen-containing solvent 5 through the pores, it is capable of dissolving oxygen gas into the oxygen-containing solvent 5. By dissolving the oxygen gas into the oxygen-containing solvent 5 by bubbling, even when the dissolved oxygen in the oxygen-containing solvent 5 decreases in relation to the discharge reaction at the power section 4, it is possible to rapidly supply oxygen into the oxygen-containing solvent 5.

The oxygen gas to be supplied from the oxygen supply means 11 to the oxygen-containing solvent 5 may be an oxygen gas having a pressure of $1.01 \times 10^5$ Pa and an oxygen concentration of 99.99%. Moreover, in a case where a filter (not shown) is provided to the oxygen supply means 11, it becomes possible to inhibit ingress of water and unnecessary gas into the oxygen-containing solvent 5. The shape of the oxygen supply means 11 is not particularly limited. In addition, as the material of the oxygen supply means 11, for example, in view of stability to the oxygen-containing solvent 5, any kind of materials usable for air battery can be suitably used.

2. Second Embodiment of the Invention

Figure 2:
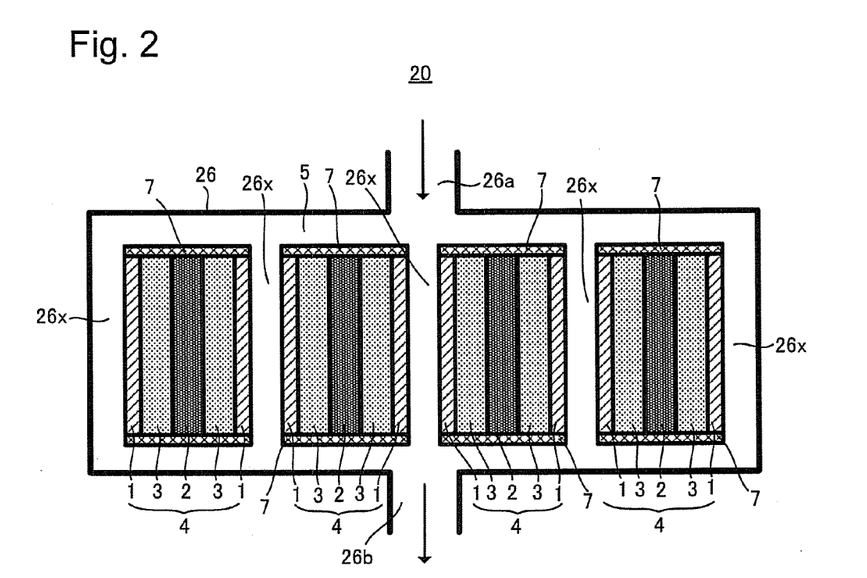
FIG. 2 is a cross-sectional view showing an embodiment of the air battery 20.

FIG. 2 is a cross-sectional view schematically showing an embodiment of the air battery 20 of the invention. In FIG. 2, to the elements having the same structure as those in the air battery 10, the same reference numerals as used in FIG. 1 are given, and the explanation thereof is omitted.

As shown in FIG. 2, the air battery 20 comprises: a plurality of power sections 4, 4, . . . comprising air electrode(s) 1, an anode 2, and electrolyte layer(s) 3 sandwiched between the air electrode 1 and the anode 2; an oxygen-containing solvent 5; and a housing 26 being configured to incorporate the plurality of power sections 4 and an oxygen-containing solvent 5. In the air battery 20, since the housing 26 is filled with an hydrophobic oxygen-containing solvent 5, ingress of water into the housing 26 can be inhibited. In addition, since the power section 4 is incorporated in the housing 26 such that the air electrode 1 is in contact with the oxygen-containing solvent 5 and the oxygen-containing solvent 5 has not only hydrophobic nature but also oxygen solubility, it is not only possible to supply oxygen dissolved in the oxygen-containing solvent 5 to the air electrode 1 but also possible to inhibit ingress of water to the anode 2. Hence, the air battery 20 can maintain a good battery performance and inhibit deterioration of the battery caused by the reaction of the anode 2 with water. The air battery 20 will be described as follows on the element basis.

\<Housing 26\>

The housing 26 incorporates the power section (s) 4 and is filled with the oxygen-containing solvent 5. In addition, the housing 26 is provided with the inlet port 26a and the outlet port 26b for the oxygen-containing solvent 5. The material of the housing 26 may be the same one as that of the housing 6.

\<Oxygen-Containing Solvent 5\>

The oxygen-containing solvent 5 in the air battery 20 may be the same as that of the air battery 10. In the air battery 20, the oxygen-containing solvent 5 flows in the direction shown by arrows of FIG. 2. In other words, the oxygen-containing solvent 5 enters from the inlet port 26a to the housing 26 and is discharged from the outlet port 26b to outside the housing 6 through the flow paths 26x, 26x, . . . . By having the embodiment, compared with the air battery 10, it is possible for the oxygen-containing solvent 5 to contact a large number of the air electrodes 1 at once so that unevenness of oxygen concentration in the oxygen-containing solvent 5 can be less.

\<Other Elements\>

Although elements apart from the above are not shown in FIG. 2, in the same manner as the air battery 10, the air battery 20 is preferably provided with an oxygen supply portion and a cyclic path.

3. Third Embodiment of the Invention

Figure 3:
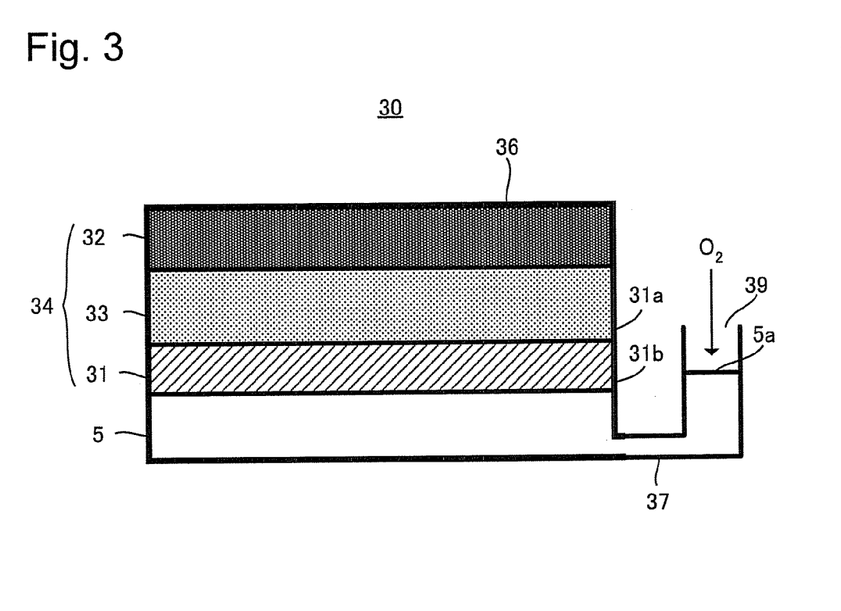
FIG. 3 is a cross-sectional view showing an embodiment of the air battery 30.

FIG. 3 is a cross-sectional view schematically showing an embodiment of the air battery 30 of the present invention. In FIG. 3, to the elements having the same structure as those in the air battery 10, the same reference numerals as those used in FIG. 1 are given and the explanation thereof is omitted.

As shown in FIG. 3, the air battery 30 comprises: a power section 34 comprising an air electrode 31, an anode 32, and an electrolyte layer 33 sandwiched between the air electrode 31 and the anode 32; an oxygen-containing solvent 5; and a housing 36 being configured to incorporate the power section 34 and the oxygen-containing solvent 5. The specific gravity of the electrolytic solution provided in the electrolyte layer 33 is smaller than that of the oxygen-containing solvent 5. The power section 34 is arranged at the upper side in the vertical direction of the oxygen-containing solvent such that the anode 32 is arranged at the upper side in the vertical direction. Moreover, in the air battery 30, an oxygen supply portion 39 is provided to supply oxygen gas to the oxygen-containing solvent 5.

In the air battery 30, since the housing 36 is filled with the hydrophobic oxygen-containing solvent 5, it is possible to inhibit ingress of water into the housing 36. The power section 34 is incorporated in the housing 36 such that the air electrode 31 is in contact with the oxygen-containing solvent 5 and the oxygen-containing solvent 5 has not only hydrophobic nature but also oxygen solubility; so, it is not only possible to supply oxygen dissolved in the oxygen-containing solvent 5 to the air electrode 31 but also possible to inhibit ingress of water to the anode 32. Hence, the air battery 30 can maintain a good battery performance and inhibit deterioration of the battery caused by reaction of the anode 32 with water. The air battery 30 will be described as follows on the element basis.

<Power Section 34>

The power section 34 comprises: an air electrode 31 arranged at a side contacting the oxygen-containing solvent 5; an electrolyte layer 33 provided on the upper side surface of the air electrode 31; and an anode 32 provided on the upper side surface of the electrolyte layer 33, wherein the air electrode 31 and the anode 32 are in contact with the electrolyte layer 33. FIG. 3 shows schematically a cross-sectional view of the power section 34; the power section 34 is a laminated body where the air electrode 31 and the anode 32 sandwich the electrolyte layer 33.

The material constituting the air electrode (i.e. cathode layer) 31 may be the same as the one used for the cathode layer 1; the function of the cathode layer 31 is the same as that of the cathode layer 1. The material constituting the anode 32 may be the same as the one used for the anode 2; the function of the anode 32 is the same as that of the anode 2. The material constituting the electrolyte layer 33 may be the same as the one used for the electrolyte layer 3; the function of the electrolyte layer 33 is the same as that of the electrolyte layer 3. It should be noted that, as described above, the specific gravity of the electrolyte provided in the electrolyte layer 33 is smaller than that of the oxygen-containing solvent 5; the electrolytic solution is insoluble in the oxygen-containing solvent 5.

In the power section 34, since the specific gravity of the electrolytic solution provided in the electrolyte layer 33 is smaller than that of the oxygen-containing solvent 5 and the electrolytic solution is insoluble in the oxygen-containing solvent 5, the lower surface of the electrolytic solution is supported by the oxygen-containing solvent 5. The other surface of the electrolyte layer 33 is covered with the anode 32 or the housing 36; thereby volatilization of the electrolytic solution provided in the electrolyte layer 33 can be inhibited. On the other hand, the electrolytic solution provided in the electrolyte layer 33 is insoluble in the oxygen-containing solvent 5; thereby, even when the electrolytic solution and the oxygen-containing solvent 5 are mixed temporarily because of shaking of the air battery 30, these are separated by themselves. The interface between the electrolytic solution and the oxygen-containing solvent 5 is preferably located in the air electrode 31. The location of the interface between the electrolytic solution and the oxygen-containing solvent 5 can be adjusted by adjusting the amount of the electrolytic solution and the oxygen-containing solvent 5 both incorporated in the housing 36 as well as the pressure given from the below-described interface 5a to the oxygen-containing solvent 5.

<Housing 36>

In the housing 36, at least the power section 34 and the oxygen-containing solvent 5 are incorporated; to the lower portion of the housing 36, an oxygen supply pipe (i.e. connecting pipe) 37 communicating with the oxygen supply portion 39 is connected. As the material of the housing 36, any kind of materials usable for housing of air battery can be suitably used.

<Oxygen Supply Portion 39>

The air battery 30 is provided with the oxygen supply portion 39 to supply oxygen to the oxygen-containing solvent 5. One end of the oxygen supply portion 39 is formed at the other end of the oxygen supply pipe 37 connected to the lower portion of the housing 36. Between the oxygen supply pipe 37 and the housing 36, the oxygen-containing solvent 5 can intercommunicate; in the oxygen supply pipe 37, an interface 5a between the oxygen-containing solvent 5 and the oxygen-containing gas is formed. Oxygen can be taken from the interface 5a into the housing 36 through the oxygen-containing solvent 5. To make the interface 5a be an interface between the oxygen-containing solvent 5 and oxygen-containing gas, for example, an interface between air and the oxygen-containing solvent 5 can be given by opening oxygen supply portion 39; alternatively, an interface between oxygen gas and the oxygen-containing solvent 5 may be given by connecting e.g. oxygen tank to the oxygen supply portion 39. Moreover, the oxygen supply portion 39 is arranged at a higher position than the interface 5a so that it is possible to inhibit leakage of the oxygen-containing solvent 5 from the oxygen supply portion 39. It should be noted that the position of the interface 5a is changed depending on, for example, the pressure given to the oxygen-containing solvent 5 at the interface between the electrolytic solution and the oxygen-containing solvent 5 in the housing 36 (i.e. pressure by e.g. gravity affecting the electrolytic solution) and the inner diameter of the oxygen supply pipe 37.

4. Fourth Embodiment of the Invention

Figure 4:
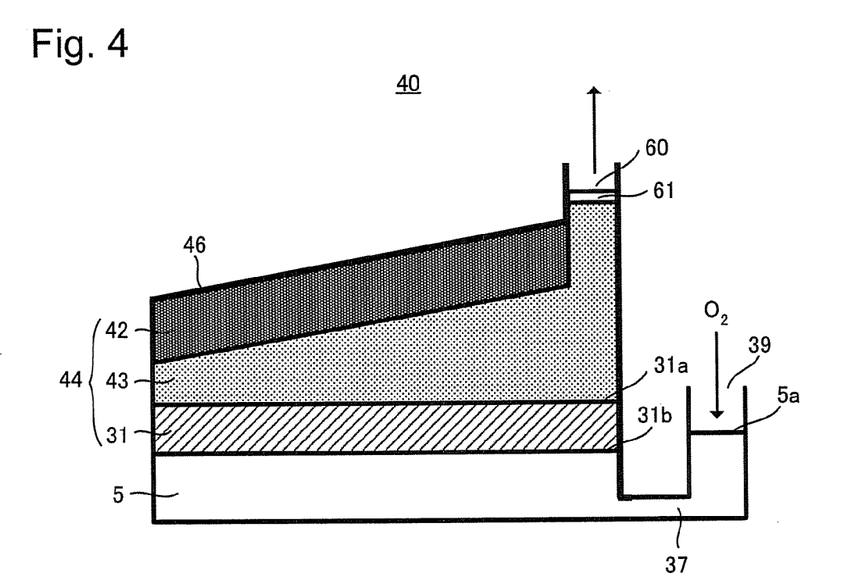
FIG. 4 is a cross-sectional view showing an embodiment of the air battery 40.

FIG. 4 is a cross-sectional view schematically showing an embodiment of the air battery 40 of the present invention. In FIG. 4, to the elements having the same structure as those in the air battery 30, the same reference numerals as those used in FIGS. 1 and 3 are given and the explanation thereof is omitted.

As shown in FIG. 4, the air battery 40 comprises: a power section 44 comprising an air electrode 31, an anode 42, and an electrolyte layer 43 arranged between the air electrode 31 and the anode 42; an oxygen-containing solvent 5; and a housing 46 being configured to incorporate the power section 44 and the oxygen-containing solvent 5. The specific gravity of the electrolytic solution provided in the electrolyte layer 43 is smaller than that of the oxygen-containing solvent 5; the power section 44 is formed in a manner where the anode 42 is arranged on the upper side in the vertical direction of the oxygen-containing solvent 5 in the vertical direction. Moreover, the air battery 40 is provided with the oxygen supply portion 39 to supply oxygen gas to the oxygen-containing solvent 5. As described below, the air battery 40 further comprises: an exhaust port 60 having a regulator 61 to be released at a predetermined pressure; and an inducing means to induce gas to the exhaust port 60.

In the air battery 40, since the housing 46 is filled with the hydrophobic oxygen-containing solvent 5, ingress of water into the housing 46 can be inhibited. The power section 44 is incorporated in the housing 46 such that the air electrode 31 contacts oxygen-containing solvent 5 and the oxygen-containing solvent 5 has not only hydrophobic nature but also oxygen solubility so that it is not only possible to supply oxygen dissolved in the oxygen-containing solvent 5 to the air electrode 31 but also possible to inhibit ingress of water to the anode 42. Accordingly, the air battery 40 can maintain a good battery performance and inhibit deterioration of the battery caused by reaction of the anode 42 with water. The air battery 40 will be described as follows on the element basis.

<Power Section 44>

The power section 44 comprises: the air electrode 31 arranged at a side contacting with the oxygen-containing solvent 5; the electrolyte layer 43 arranged on the upper surface of the air electrode 31; and the anode 42 arranged on the upper surface of the electrolyte layer 43, wherein the air electrode 31 and the anode 42 are in contact with the electrolyte layer 43. FIG. 4 schematically shows a cross-sectional view of the power section 44; the power section 44 is a laminated body in which the air electrode 31 and the anode 42 sandwich the electrolyte layer 43.

The material constituting the anode 42 may be the same as the one used for the anode 2; the function of the anode 42 is the same as that of the anode 2. The material constituting the electrolyte layer 43 may be the same as the one used for the electrolyte layer 3; the function of the electrolyte layer 43 is the same as that of the electrolyte layer 3. It should be noted that, as above, the specific gravity of the electrolytic solution provided in the electrolyte layer 43 is smaller than that of the oxygen-containing solvent 5 and the electrolytic solution is insoluble in the oxygen-containing solvent 5.

<Housing 46>

The housing 46 incorporates at least the power section 44 and the oxygen-containing solvent 5. At the upper portion of the housing 46, an exhaust port 60 is provided; the exhaust port 60 is provided with a regulator 61 to be released at a predetermined pressure. By having the exhaust port 60, gas generated from the air electrode 31 at a time of charging battery can be discharged. However, if the exhaust port 60 is always opened, outside air containing unnecessary element such as water tends to be taken in; thus, the regulator 61 is provided. When the pressure given from inside of the housing 46 to the regulator 61 reaches a predetermined pressure, the regulator 61 is released; thus, it is possible to discharge the gas generated from the air electrode 31 at a time of charging battery and possible to inhibit taking the outside air into the housing 46. As the material constituting the housing 46, any kind of materials usable for the housing of air battery can be suitably used.

<Inducing Means>

The air battery 40 is provided with a inducing means to direct gas toward the exhaust port 60. In the embodiment shown in FIG. 4, the anode 42 functions as a inducing means. Namely, as shown in FIG. 4, by tilting the anode 42 such that one end thereof adjacent to the exhaust port 60 become higher than the other end, the gas generated from the air electrode 31 is directed to the exhaust port 60 along the lower surface of the anode 42. By collecting the gas to be discharged at a particular site in this way, it is capable of efficiently discharge the gas.

Figure 5A:
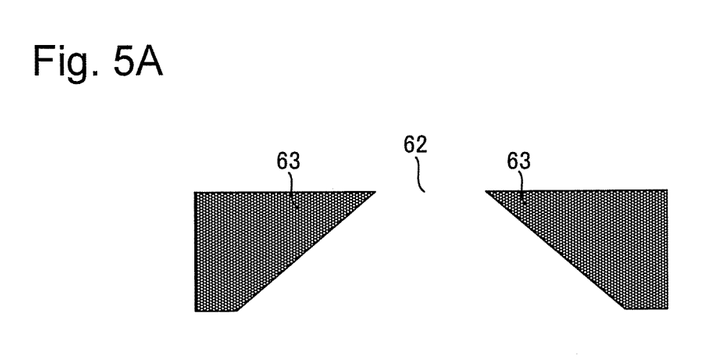
FIGS. 5A and 5B are cross-sectional views each showing a mode of the inducing means.
Figure 5B:
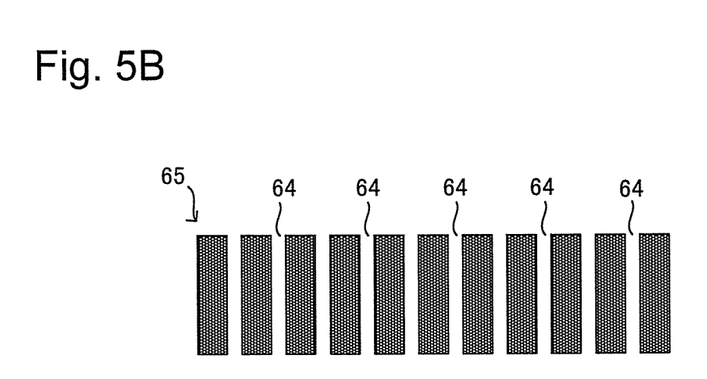

The inducing means is not particularly restricted to the above mode as long as it can collect the gas generated from the air electrode 31 at a predetermined site (i.e. vicinity of the exhaust port). As another example of the inducing means, modes shown in FIGS. 5A and 5B may be adopted. FIGS. 5A and 5B are cross-sectional views each schematically showing modes of the inducing means (i.e. anode). As shown in FIG. 5A, when the anode 63 is formed such that the bottom of the anode 63 to which the electrolyte layer is provided is notched in a truncated cone form, gas can be directed toward the exhaust port 62. Alternatively, as shown in FIG. 5B, when the anode 65 has a grid formation in the horizontal plane, gas can also be directed toward the exhaust port 64, 64, . . . .

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that air battery with such an alternation are included in the technical scope of the invention.

INDUSTRIAL APPLICABILITY

The air battery of the present invention can be used for power source of, for example, electric vehicles and mobile devices.

The invention claimed is:

1. An air battery comprising:
   a power section which comprises: an air electrode, an anode containing an alkali metal, and an electrolyte layer conducting ions between the air electrode and the anode;
   an oxygen-containing solvent showing both hydrophobic nature and oxygen solubility;
   a housing being configured to incorporate the power section and the oxygen-containing solvent; and
   an oxygen supply portion being configured to supply oxygen gas to the oxygen-containing solvent,
   the oxygen-containing solvent being arranged between the oxygen supply portion and the electrolyte layer
   the oxygen-containing solvent being a fluorine-based solvent, wherein the housing is provided with an inlet port and an outlet port for the oxygen-containing solvent, and wherein the oxygen-containing solvent is a liquid which is insoluble in an electrolytic solution provided to the electrolyte layer.

2. The air battery according to claim 1, wherein the oxygen supply portion has an oxygen supply means to supply the oxygen gas by bubbling.

3. The air battery according to claim 1, further comprising a cyclic path being disposed outside the housing to circulate the oxygen-containing solvent from the outlet port to the inlet port,
   the oxygen-containing solvent circulating in the housing and the cyclic path.

4. The air battery according to claim 1, wherein the electrolyte layer is insoluble in the oxygen-containing solvent and has a smaller specific gravity than that of the oxygen-containing solvent, and the power section is arranged at the upper side in the vertical direction of the oxygen-containing solvent such that the anode is arranged at the upper side in the vertical direction.

5. The air battery according to claim 4, wherein an interface between the electrolyte layer and the oxygen-containing solvent is in the air electrode.

6. The air battery according to claim 4, wherein the oxygen supply portion is provided at one end of an oxygen supply pipe, the other end of which is connected to the lower portion of the housing, and an interface is formed between the oxygen-containing solvent and the oxygen-containing gas in the oxygen supply pipe, wherein the oxygen supply portion is located at a higher level than that of the interface.

7. The air battery according to claim 4, wherein an exhaust port is provided at the upper portion of the housing.

8. The air battery according to claim 7, wherein a regulator to be released at a predetermined pressure is provided at the exhaust port.

9. The air battery according to claim 7, wherein an inducing means is configured to direct the air inside the housing toward the exhaust port.

10. The air battery according to claim 1, wherein a plurality of the power sections are incorporated in the housing.

11. The air battery according to claim 2, wherein the housing is provided with: an inlet port and an outlet port for the oxygen-containing solvent; and a cyclic path being disposed outside the housing to circulate the oxygen-containing solvent from the outlet port to the inlet port, the oxygen-containing solvent circulating in the housing and the cyclic path.

12. The air battery according to claim 2, wherein the electrolyte layer is insoluble in the oxygen-containing solvent and has a smaller specific gravity than that of the oxygen-containing solvent, and the power section is arranged at the upper side in the vertical direction of the oxygen-containing solvent such that the anode is arranged at the upper side in the vertical direction.

13. The air battery according to claim 3, wherein the electrolyte layer is insoluble in the oxygen-containing solvent and has a smaller specific gravity than that of the oxygen-containing solvent, and the power section is arranged at the upper side in the vertical direction of the oxygen-containing solvent such that the anode is arranged at the upper side in the vertical direction.

14. The air battery according to claim 5, wherein the oxygen supply portion is provided at one end of an oxygen supply pipe, the other end of which is connected to the lower portion of the housing, and an interface is formed between the oxygen-containing solvent and the oxygen-containing gas in the oxygen supply pipe, wherein the oxygen supply portion is located at a higher level than that of the interface.

15. The air battery according to claim 5, wherein an exhaust port is provided at the upper portion of the housing.

16. The air battery according to claim 6, wherein an exhaust port is provided at the upper portion of the housing.

17. The air battery according to claim 8, wherein an inducing means is configured to direct the air inside the housing toward the exhaust port.

* * * * *

UNITED STATES PATENT AND TRADEMARK OFFICE
CERTIFICATE OF CORRECTION

PATENT NO. : 8,802,302 B2
APPLICATION NO. : 12/678001
DATED : August 12, 2014
INVENTOR(S) : Shinji Nakanishi et al.

It is certified that error appears in the above-identified patent and that said Letters Patent is hereby corrected as shown below:

In the Specification

At column 6, line 28, change "$LiPF_6$, $LiClO_4$" to -- $LiPF_6$, $LiBF_4$, $LiClO_4$ --.

At column 6, line 30, change "$LiN(CF_3SO_2)_2$." to -- $LiN(CF_3SO_2)_2$, --.

At column 7, line 20, change "name "7100")$_r$" to -- name "7100"), --.

Signed and Sealed this
Twenty-first Day of April, 2015

Michelle K. Lee
*Director of the United States Patent and Trademark Office*